Dec. 14, 1948.  W. A. RAY  2,455,948
HYDRAULIC CONTROL SYSTEM FOR AIRPLANES
Filed Oct. 17, 1942  4 Sheets-Sheet 1
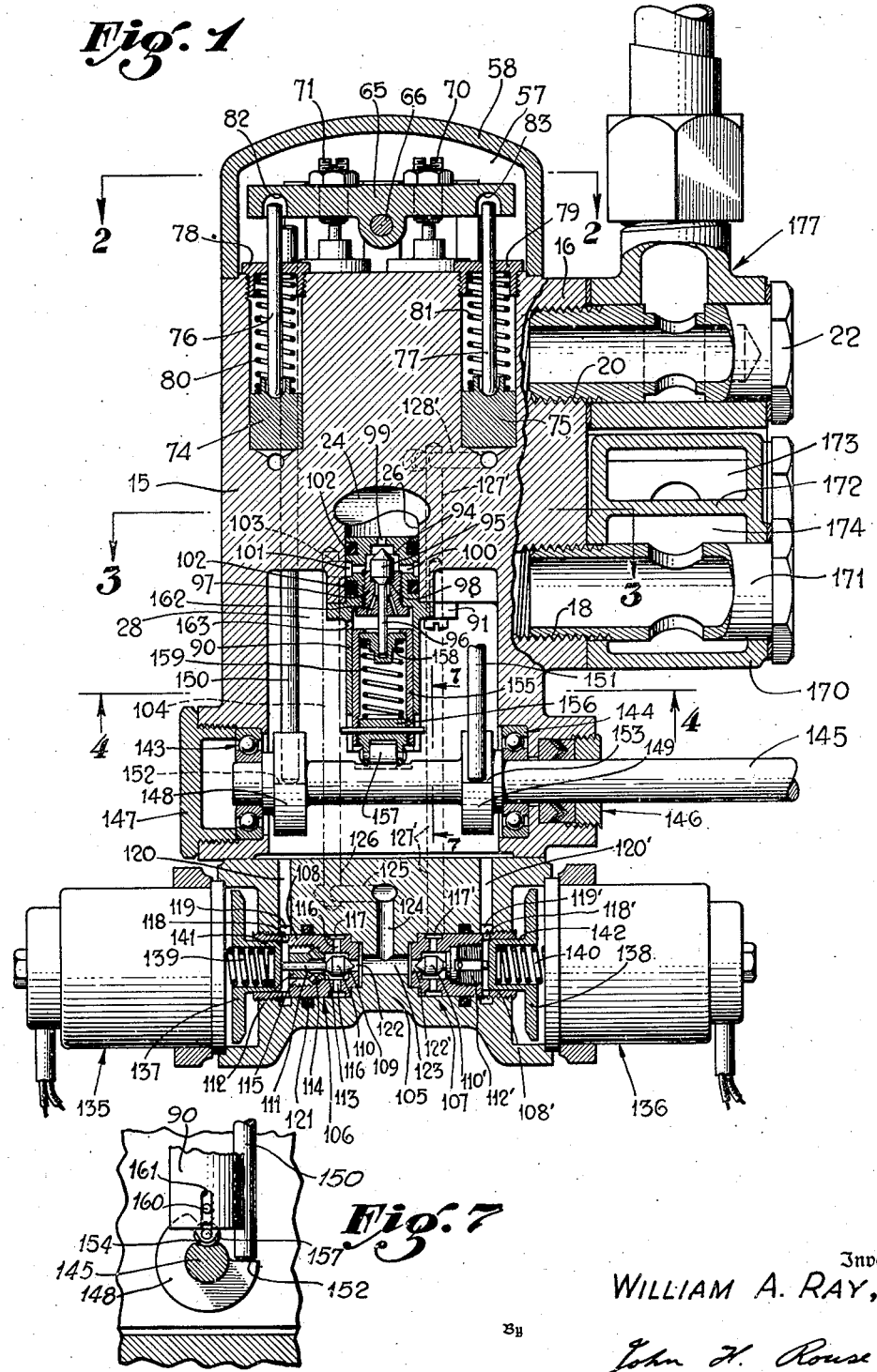
Inventor:
WILLIAM A. RAY,
By John H. Rouse,
Attorney.

Dec. 14, 1948. W. A. RAY 2,455,948
HYDRAULIC CONTROL SYSTEM FOR AIRPLANES
Filed Oct. 17, 1942 4 Sheets-Sheet 2
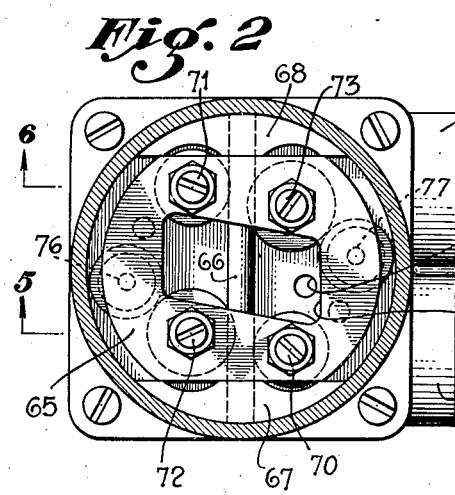
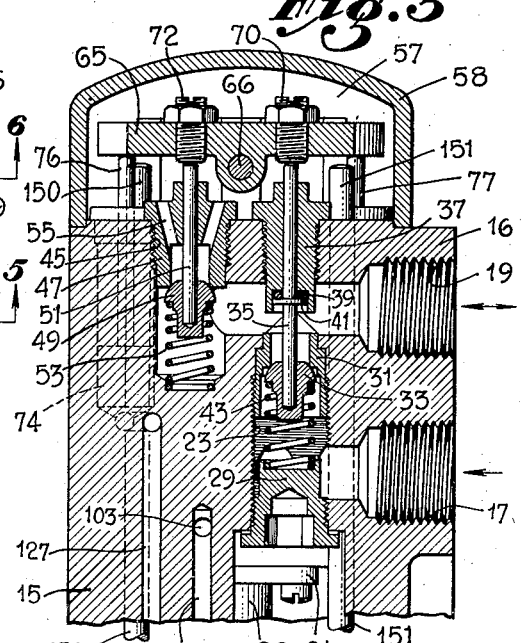
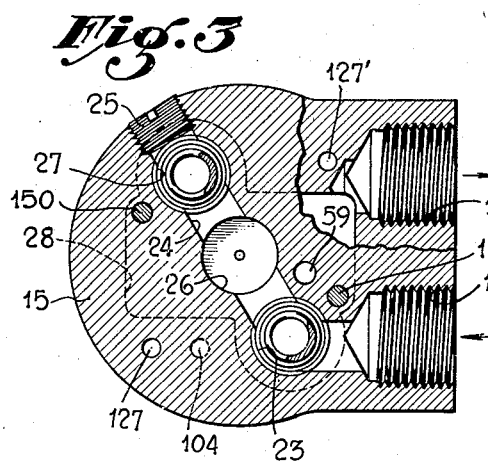
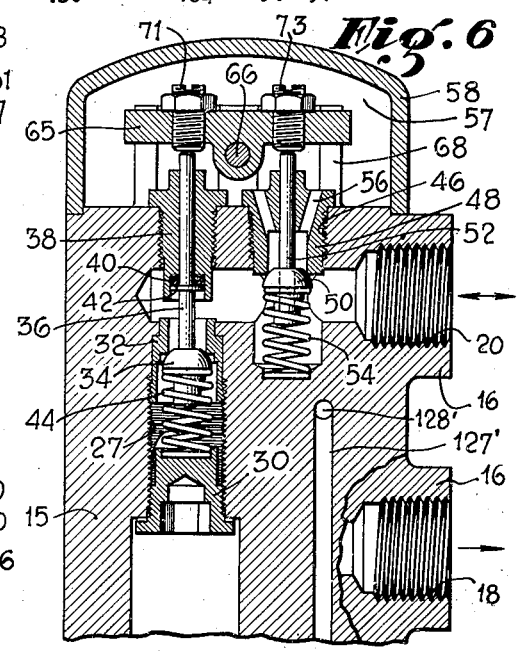
Inventor:
WILLIAM A. RAY,
By John H. Rouse,
Attorney.

Dec. 14, 1948.  W. A. RAY  2,455,948
HYDRAULIC CONTROL SYSTEM FOR AIRPLANES
Filed Oct. 17, 1942  4 Sheets-Sheet 3

Inventor:
WILLIAM A. RAY,
John H. Rouse,
Attorney.

Dec. 14, 1948.    W. A. RAY    2,455,948
HYDRAULIC CONTROL SYSTEM FOR AIRPLANES
Filed Oct. 17, 1942    4 Sheets-Sheet 4

Inventor:
WILLIAM A. RAY,
By John H. Rouse,
Attorney.

Patented Dec. 14, 1948

2,455,948

UNITED STATES PATENT OFFICE 2,455,948

HYDRAULIC CONTROL SYSTEM FOR AIRPLANES

William A. Ray, Los Angeles, Calif., assignor to General Controls Co., a corporation Application October 17, 1942, Serial No. 462,363

1 Claim. (Cl. 244—75)

My present invention relates to control systems, and more particularly to hydraulic control systems for airplanes and to valve structures for controlling such systems.

In airplanes which employ hydraulically operated motors for actuating movable parts of the airplane, such as wing flaps, retractible landing gear, or bomb doors, it is customary to run the hydraulic lines or pipes from the source of hydraulic pressure, which is generally a pump driven by the propulsion engine of the airplane, to the control station in the fuselage and thence to the hydraulic motors; control valves being provided in the hydraulic lines at the control station in a position accessible to the pilots or flight engineer. Such an arrangement calls for a large amount of hydraulic piping which not only adds undesirable weight and crowds the control station, but also, when the airplane is used for war purposes, renders it more vulnerable to gun fire. It is therefore an object of this invention to provide a hydraulic control system of the character described wherein the required amount of hydraulic piping is considerably reduced. I accomplish this object, primarily, by locating the control valves at a point adjacent the engine and pump, and by providing electrically operated means for actuating the valves, the electric circuit for the operating means being extended to switching means at the control station. By this arrangement, the hydraulic lines can be run from the source of pressure to the individual motors by the shortest paths. The only point of concentration of tubing and of valves is therefore at the engine (preferably behind it) where these parts are to a considerable degree protected from damage by gun fire or from other causes and, if desired, can be further protected by armor. Another advantage gained by this arrangement is due to the reduction in the number of pipe connections at which leakage might occur.

Another object is the provision, in an electrohydraulic control system of the character described in the preceding object, of mechanical means for independently actuating the valves, and a mechanical connection extending between the actuating means and the control station; the mechanical actuating means including means for rendering the electrically operated means ineffective so that mechanical actuation is facilitated.

Another object is the provision of a control valve which, while capable of other uses, is particularly adapted for use in an electro-hydraulic control system of the character described above.

A more specific object is the provision, in such a valve, of fluid pressure operated means for actuating the main valve means, electrically operated pilot valve means for controlling the pressure operated actuating means, and mechanical means for independently actuating the main valve means and including valve means, operated by initial movement of the mechanical means, for obstructing supply of pressure fluid to the normal actuating means and for venting the same. A further object is to provide, in a valve of the type indicated, a pivoted rocker with which the main valve means, the pressure operated actuating means, and the mechanical actuating means, all cooperate to effect operation of the valve.

Other objects and advantages of the invention will be found in the description, the drawing, and in the claim; and for full understanding of the invention, reference may be had to the following detailed description and accompanying drawing, wherein:

Figure 1 is a view, mainly in central vertical section, of a valve embodying my invention;

Figures 2, 3 and 4 are transverse sections taken generally along the lines 2—2, 3—3 and 4—4, respectively, of Fig. 1;

Figures 5 and 6 are fragmentary vertical sections taken along the lines 5—5 and 6—6, respectively, of Fig. 2;

Figure 7 is a fragmentary detail section taken along the line 7—7 of Fig. 1;

Figure 8:
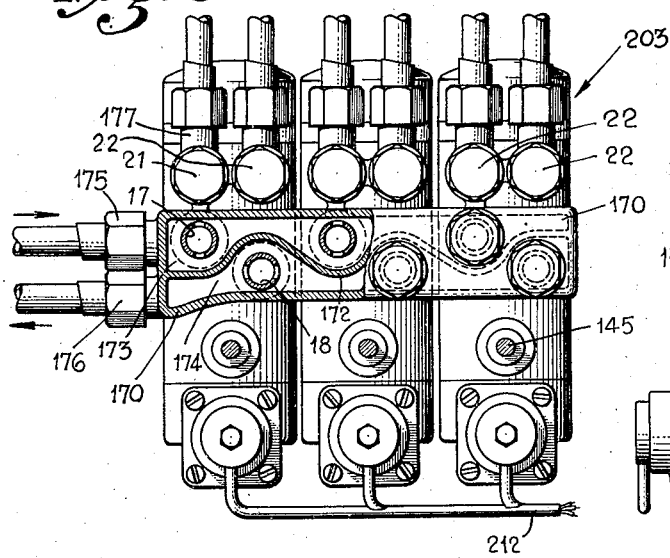
Figure 8 is a side elevation, to reduced scale, of a plurality of the valves shown in Fig. 1, joined together by a manifold.
Figure 9:
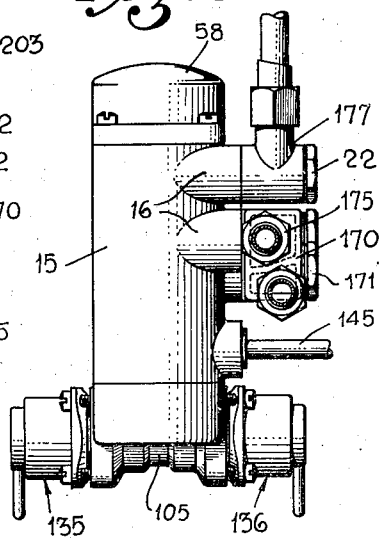
Figure 9 is a front elevation, to reduced scale, of the valve shown in Fig. 1.

Referring first more particularly to Figs. 1–9, the numeral 15 indicates a generally-cylindrical elongated casting which forms the main body of the valve. As is best seen in Fig. 9, a plurality of bosses 16 extend from the upper right-hand portion of the main body, the bosses being bored to provide the inlet, outlet and two control passages of the main valve, which is of the four-way type. The inlet passage is indicated at 17 in Figs. 5 and 3, the outlet at 18 in Figs. 6, 3, and 1, one of the control passages at 19 in Fig. 5, and the other control passage at 20 in Figs. 6 and 1. The arrangement of the outer ends of the passages will be clear from inspection of Fig. 8, wherein the control passages 19 and 20 are in the upper bosses under caps 21 and 22, respectively; the inlet 17 and outlet 18 being in the lower bosses, as indicated.

As is best seen in Fig. 3, the inlet passage 17 communicates with a vertical passage 23, from which a horizontal passage 24 extends diagonally across the body to its exterior where it is closed by a plug 25, the passage 24 intersecting a central vertical bore 26 and another vertical passage 27. The vertical passages 23 and 27 extend from the top of the main body 15 to an irregular shaped cavity 28 (Figs. 1, 3 and 4) formed in the lower portion of the body. The bottom ends of passages 23 and 27, respectively, are closed by plugs 29 (Fig. 5) and 30 (Fig. 6), and above these plugs are threaded tubular valve seat members 31 and 32, cooperable with semispherical closure members 33 and 34 from which extend valve stems 35 and 36, the upper end portions of which are guided by bushings 37 and 38 threaded in the top ends of the passages. To prevent leakage around the valve stems, the bottom ends of the bushings 37 and 38 are recessed to receive rubber packing rings 39 and 40 which fit snugly between the stems and the walls of the recesses. These rings can roll in the movement of the stems and are prevented from leaving the recesses by collars 41 and 42 formed on the stems. Urging the closure members 33 and 34 upwardly toward seating position, are compression springs 43 and 44, respectively.

Two other vertical passages 45 (Fig. 5) and 46 (Fig. 6) extend a short distance downward from the top surface of the main body 15, and threaded in these passages are like fittings 47 and 48 which form at their bottom ends seats for semispherical closure members 49 and 50, the upwardly extending stems 51 and 52 of these closures being guided in central openings through the top portions of the fittings. At the lower ends of passages 45 and 46 are compression springs 53 and 54 which urge the closure members 49 and 50 upwardly toward seating position. In the upper portions of the fittings 47 and 48 are inclined openings 55 and 56 which connect the areas above the closures 49 and 50 with a chamber 57 above the main body 15 formed by a cap 58 secured thereto.

As is seen in Fig. 5, a horizontal extension of the control passage 19 intersects the vertical passages 23 and 45 and communicates with the area above the closure 33 and with that below the closure 49. In a similar manner, as is seen in Fig. 6, the other control passage 20 communicates with the area above the closure 34 and with that below the closure 50. It will thus be apparent that if the closures 33 and 50 (only) are simultaneously opened, fluid can pass from the inlet 17 to the control passage 19; and from the other control passage 20 to the chamber 57, and thence through a vertical passage 59 (Figs. 2, 3 and 4) which extends from the top surface of the main body to the lower cavity 28, to the outlet 18 which (as is seen in Fig. 3) communicates with that cavity. Likewise, if the other pair of closures 34 and 49 (only) are simultaneously opened, fluid can then pass from the inlet 17 (through the diagonal passage 24) to the control passage 20, and from the control passage 19 to the outlet 18. This arrangement, when operated in the manner described, thus constitutes a four-way valve.

For selectively actuating the pairs of closures 33, 50 and 34, 39, a rocker 65 is mounted on a pin 66, the outer ends of which are supported in openings through portions 67 and 68 (Fig. 2) of the main body 15 which extend from the top surface of the same at the front and rear. The rocker 65 is provided with an irregular opening 69, to reduce its weight, and carries four screws 70—73 which are so positioned as to engage the tops of the valve stems 35, 36, 51 and 52, respectively, when the rocker is actuated. These screws are so adjusted that, when the rocker is in its neutral position as shown, there is a slight clearance between each screw and its corresponding valve stem.

For actuating the rocker 65, there is provided a pair of pistons 74 and 75 (Fig. 1) which are reciprocable in cylinder bores formed in the top surface of the main body. The pistons are provided with rocker-actuating stems 76 and 77 which rest in shallow recesses in the tops of the pistons and are guided in bushings 78 and 79 threaded in the upper ends of the cylinders. Urging the pistons downward, and compressed between them and the bushings, are springs 80 and 81. If the left-hand piston 74 is operated, the rocker is rotated in a clockwise direction by the engagement therewith of the piston stem 76 (the other piston stem 77 limiting rotation of the rocker) so that actuation of closures 33 and 50 is effected; likewise, if piston 75 is operated, the rocker is rotated counterclockwise to actuate closures 34 and 49. Round-bottomed recesses 82 and 83, in the underside of the rocker, loosely receive the top portions of the piston stems and serve to prevent their lateral displacement.

The means whereby pressure fluid from the inlet 17 is suppled to the piston cylinders to effect actuation of the rocker, will now be described. Fitting within the lower end of bore 26 (Fig. 1), which is in constant communication with the inlet 17, is the upper end portion of an elongated hollow cylindrical member 90 which is secured in position by ears 91 which extend from its opposite sides, these ears being attached by screws to a rhomboidal-shaped boss 92 (Fig. 4) which projects from the top surface 93 of the cavity 28. The upper portion of member 90 constitutes a three-way valve and is bored to provide an upper seat 94 for a closure member 95 having a stem 96 guided in a bushing 97, which bushing also provides a lower valve seat 98 for the closure. When the closure is in the position shown, fluid can pass from the bore 26, through an opening 99 in the top of the member 90, around the upper seat 94, and thence through radial openings 100 to a circumferential recess 101. No bias, other than gravity, is provided for the closure 95, the pressure of the inlet fluid being sufficient to maintain it in its normal position in engagement with the lower seat 98. To prevent leakage around the upper portion of member 90, packing rings 102 are provided in a pair of circumferential recesses located respectively above and below the recess 101. Communicating with the recess 101 is a horizontal passage 103 which extends generally forward to the exterior of the main body 15, where it is plugged; and joining the passage 103 is a vertical passage 104 drilled in the solid front portion of the main body (see Fig. 3) from its bottom surface.

Secured to the underside of the main body 15 is a sub-body 105 wherein is provided a pair of electromagnetically operated three-way pilot valves, generally indicated at 106 and 107. The pilot valve 106 comprises a hollow cylindrical member 108, threaded in an opening in the left-hand end of the sub-body, which provides toward its inner end a valve seat 109 cooperable with a closure 110 having a stem 111 which is guided in a bushing 112, the bushing also providing an outer seat 113 for the closure. In the bushing are inclined openings 114 which communicate with an enlargement of the stem bore adjacent the seat 113, and with slots 115 in the threaded surface of the bushing. The space between the seats 109 and 113 communicates, by means of radial openings 116, with a recess 117 around the periphery of member 108. Through the side-wall of member 108 are openings 118 which connect the space at the left of bushing 112 with an annular recess 119 formed in the surface of the sub-body opening, and from this recess a vertical passage 120 extends to the top surface of the sub-body. By the arrangement described, it will be seen that, when the closure 110 is in the position shown, the inner recess 117 is in communication with the cavity 28 in the main body, and thus with the outlet 18. Around the member 108, intermediate the recesses 117 and 119, is a packing ring 121 which is tightly received in a recess formed in the surrounding surface of the sub-body.

The right-hand pilot valve 107 is identical in construction with the pilot valve 106 and its essential elements have therefore been assigned the same numerals as those of the corresponding ones in pilot valve 106, but with a prime mark added. Openings 122 and 122', through the inner ends of the members 108 and 108', communicate with a horizontal passage 123 in the sub-body, from which passage there extend a short vertical passage 124, a horizontal passage 125, and a vertical passage 126 which registers with the passage 104 in the main body. In a similar manner, the recesses 117 and 117' communicate, respectively, with vertical aligned passages 127 and 127' formed in the sub-body and in the front and rear portions of the main body, (see Figs. 3 and 4); the upper ends of these passages communicating by horizontal passages (the rear one being shown at 128' in Fig. 1), with the areas below the pistons 74 and 75. In brief, the passage 123, joining the pilot valves 106 and 107, is in communication with the inlet 17 when closure 95 is in the position shown; recesses 117 and 117', respectively, are in communication with the areas below the pistons 74 and 75; and (as has previously been mentioned) the outer ends of the pilot valves are in communication with the outlet 18. It is thus apparent that, if the closure 110 of pilot valve 106 is moved out of engagement with the seat 109 and into engagement with the other seat 113, pressure fluid can then pass from the main inlet 17 to the piston 74 to effect clockwise rotation of the rocker 65; and, when the closure is returned to its original position, the fluid below piston 74 can escape to the outlet 18; the piston moving downward under the force of its bias spring so that the rocker reassumes its neutral position. Likewise, if the closure of pilot valve 107 is similarly actuated, piston 75 is operated to effect counterclockwise rotation of the rocker.

The aligned vertical passages 104, 126, 127, and 127' are sealingly connected at the junction of the main and sub bodies by suitable packing means which are not shown in the drawing, but may be of the type disclosed in my copending application, Serial No. 441,773, filed May 5, 1942, now Patent No. 2,364,659, issued December 12, 1944.

Figure 10:
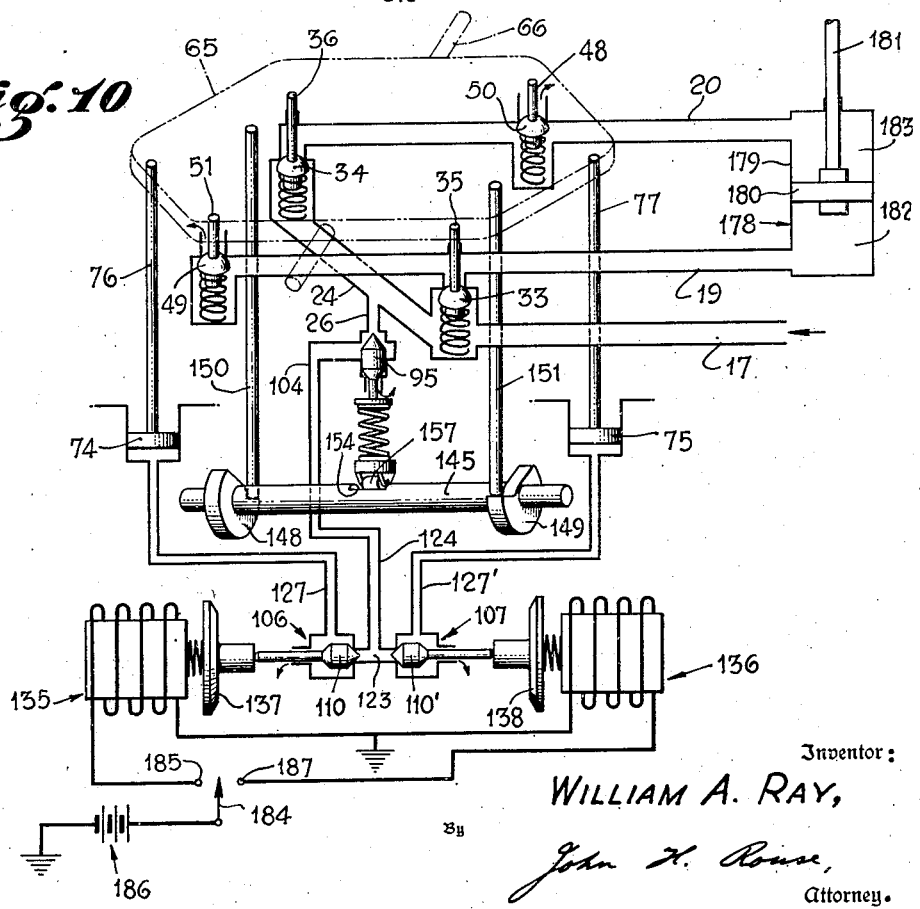
Figure 10 is a diagrammatic view of a control system embodying my invention, and including a schematic representation of the valve shown in the other figures.

For operating the pilot valves 106 and 107, electromagnets 135 and 136 are mounted in enlargements of the pilot valve end openings and cooperate respectively with armatures 137 and 138 which are biased away from the electromagnets by compression springs 139 and 140 contained in central hollow extensions 141 and 142 of the armatures. These extensions are slidable in the outer openings of members 108 and 108' and bear against the outer ends of the closure stems 111 and 111' so that the closures are normally held in the positions shown by the force of the bias springs. When one of the electromagnets is energized, its armature is attracted out of engagement with the closure stem, thus permitting the pressure of the fluid at the inner end of the pilot valve to force the closure outwardly into engagement with its seat 113 or 113'. As is seen in the diagram of Fig. 10, the electromagnets are so electrically connected that only one of them can be energized at a time. The electromagnets illustrated are of the general type disclosed in my copending application, Serial No. 429,983, filed February 9, 1942, now Patent No. 2,321,853, issued June 15, 1943, and need no further description here.

Mechanical means for operating the rocker 65 independently of the pistons 74 and 75, will now be described. Mounted in ballbearings 143 and 144 received in openings through the lower walls of the main body 15 adjacent the cavity 28, is a cam shaft 145; the outwardly extending portion of the shaft being sealed by a gland 146, and a cap 147 closing the left-hand end of the shaft opening. The cams 148 and 149 of shaft 145 are arranged to actuate, respectively, rods 150 and 151 which extend through vertical bores in the upper portion of the main body and are engageable with the underside of rocket 65 at its opposite ends; the rods being of such length that, when the cam shaft is in its neutral position as shown, they do not interfere with the actuation of the rocker by the pistons. The cams are both of the shape shown in Fig. 7 but are reversed with respect to each other so that normally rod 150 rests on shoulder 152 of cam 148, and rod 151 on shoulder 153 of cam 149. When the cam shaft 145 is turned clockwise (as viewed from its right-hand end) rod 151 is raised to effect counterclockwise rotation of the rocker, the other rod 150 correspondingly falling slightly by gravity. Means (not shown) should be provided for limiting the rotation of the cam shaft so as to prevent further downward movement of the undriven rod, or collars may be provided on the upper outer ends of the rods for that purpose. Similarly, when the cam shaft is turned counterclockwise, clockwise rotation of the rocker is effected.

Intermediate the cams 148 and 149, the shaft 145 is provided with another cam surface, or concavity, 154 (Fig. 7) which cooperates with means for actuating the closure 95. These means include a tubular plunger 155 which is slidable in the lower tubular portion of the member 90. Threaded in the bottom end of the plunger is a member 156 which carries below it a roller 157 which bears against the cam surface 154. A sliding fit in the upper end of the plunger is a member 158 which is upwardly urged by a spring 159 compressed between it and the lower member 156, upward movement of member 153 being limited by the inwardly-turned upper edge of the plunge member. The member 153 has a concentric opening extending downwardly from its outer surface for receiving the lower portion of the valve stem 96, the depth of this opening being such that there is normally a small clearance below the valve stem. To prevent rotation of the plunger 155, the roller member 156 is provided with a through-pin 160, the outer ends of which are guided in slots 161 cut in the lower end portion of the member 90, as is best seen in Fig. 7. When shaft 145 is turned in either direction from its normal position, before the rod 150 or 151 engages the rocker 65, the roller 157 rises onto the concentric portion of the shaft, thereby effecting movement of closure 95 into tight engagement with its upper seat 94 (the spring 159 yielding in the final upward movement of the roller) so that the supply of pressure fluid to the pilot valves 106 and 107 is obstructed. The lower seat 98 of closure 95 being uncovered, if either of the pilot valve closures then happens to be in its electrically operated position (or, due to some defect, has failed to return to its normal position) the fluid compressed below the particular piston can vent to the outlet chamber, defined by cavity 28, through inclined openings 162 in the bushing 97 and lateral openings 163 through the portion of member 90 immediately below that bushing. Such venting of the pistons and their fluid passages greatly facilitates the mechanical actuation of the rocker, and is essential when the fluid employed is an incompressible liquid. The cylindrical body portion of closure 95 is a close sliding fit in the bores adjacent the seats and is of such length that, when it is midway between its extreme moved positions, both of these bores are simultaneously closed by it, so that but slight leakage of fluid can occur, even if the closure is actuated slowly.

Referring now to Figs. 8 and 9 and to the upper right-hand portion of Fig. 1, it will be seen that a manifold 170 is provided for joining together a plurality of the valve structures described hereinabove; the manifold being attached to each of the structures by hollow transversely-apertured screws 171 (Fig. 1) threaded in the inlet and outlet passages. The manifold has an internal partition 172 which divides it into an upper inlet chamber 173 and a lower outlet chamber 174, fittings 175 and 176 being provided at the end of the manifold for connecting the respective chambers to a source of pressure fluid and to a return therefor, as is indicated by the arrows. The control passages 19 and 20 are similarly connected to T-fittings 177 by hollow screws, the caps 21 and 22 of which have already been referred to.

In the diagram of Fig. 10, the elements have been assigned the same numerals as those of the corresponding elements in the valve structure described hereinabove. To simplify the showing, the outlet passages have been omitted; small arrows being employed to indicate the outlet openings of the several valves. The rocker-actuated four-way valve is shown connected to control the operation of a fluid pressure motor 178, comprising a cylinder 179 wherein is reciprocable a piston 180 having an exteriorly extending stem 181; the chambers 182 and 183, at opposite sides of the piston, being connected respectively to the control passages 19 and 20 of the valve. With the parts in the positions shown, if switch arm 184 is moved into engagement with contact 185, the electromagnet 135 is energized by its electrical connection with source 186, and armature 137 is attracted; the pressure of the inlet fluid then being effective to move the pilot valve closure 110 to the left. The resultant operation of piston 74 effects clockwise tilting of the rocker 65 so that the closures 33 and 50 are opened; pressure fluid passing around closure 33 to the chamber 182, and exhausting from the other chamber 183 around closure 50—the piston 180 therefore moving upwardly. If, when or before the piston 180 has reached the limit of its travel, the switch arm 184 is returned to its neutral position, the resultant deenergization of electromagnet 135 effects return of the pilot valve closure 110 to its biased position wherein the fluid compressed below piston 74 can vent to the outlet; the force of the bias springs of closures 33 and 50 returning the rocker to its neutral position wherein all of the four-way valve closures are closed, so that the piston 180 is retained in its moved position. Similarly, if the switch arm 184 is moved into engagement with the other contact 187, the electromagnet 136 is energized, with the result that piston 75 is operated and the other pair of closures 34 and 49 opened—the piston 180 accordingly moving downward. If the cam shaft 145 is turned from its neutral position, as shown, the valve 95 is first raised to obstruct passage of pressure fluid to the pilot valves 106 and 107, and, if one of them is in operated condition, to permit venting of its associated piston 74 or 75—continued rotation of the cam shaft effecting, through rod 150 or 151, tilting of the rocker to actuate the four-way valve.

Figure 11:
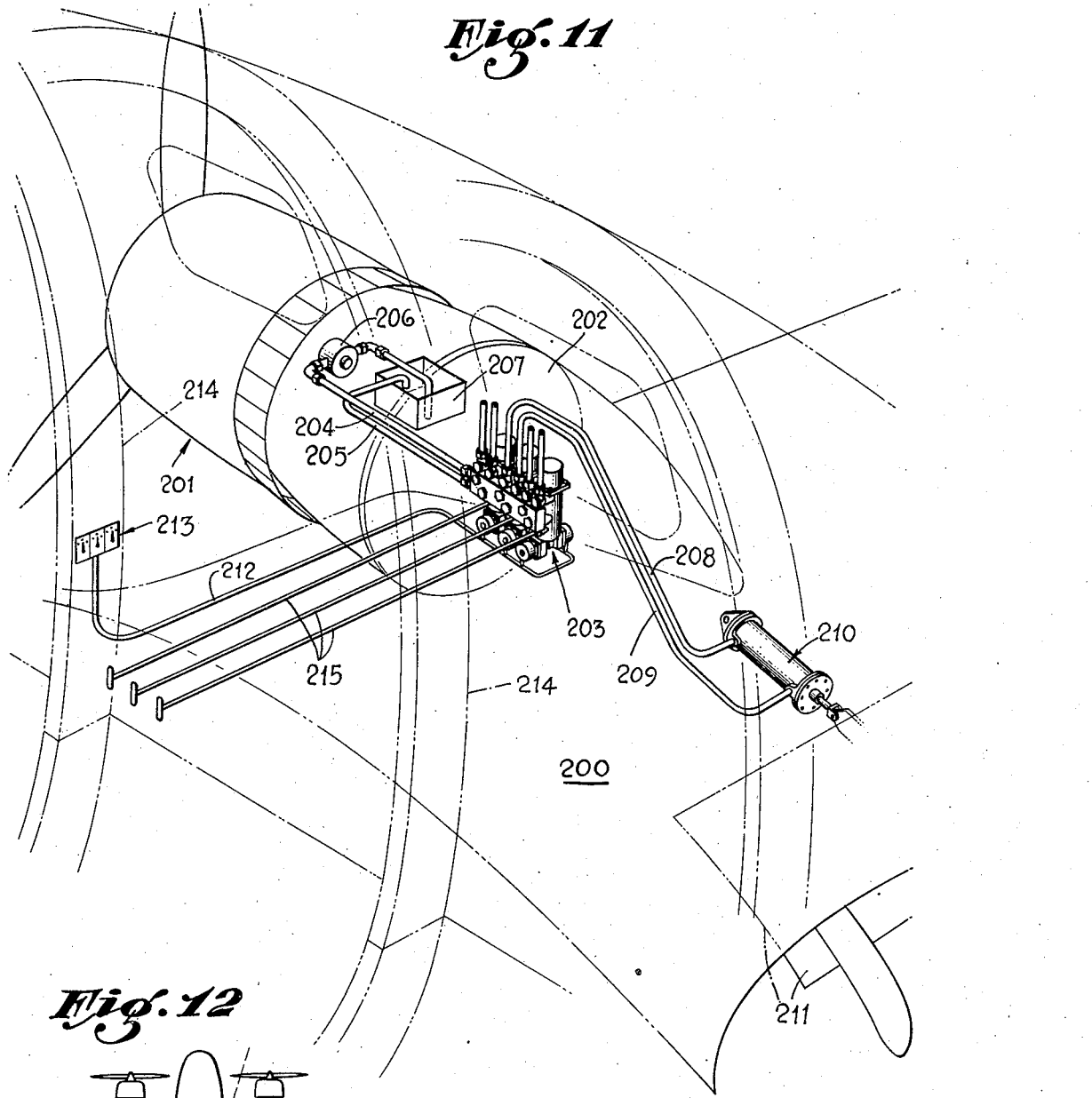
Figure 11 is a phantom view of part of an airplane, illustrating the arrangement of parts in a control system according to my invention.
Figure 12:
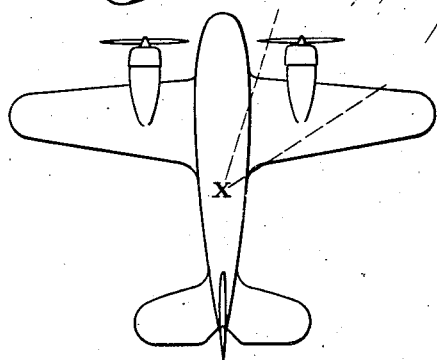
Figure 12 is a plan diagram of an airplane indicating the point from which the showing of Fig. 11 is viewed.

In Fig. 11, the group of valves of Fig. 8 are shown mounted in an airplane to control the operation of such movable parts thereof as wing flaps, retractible landing gear, or bomb doors. So that the parts of the airplane shown in Fig. 11 can more readily be identified, the point from which the view is taken is indicated at X in Fig. 12. The numeral 200 indicates the starboard wing on which an engine, generally indicated at 201, is mounted. At the rear of the engine firewall 202 is the valve group 203, the fluid inlet and outlet connections 204 and 205 of which extend respectively to a pump 206, driven by the engine, and to a reservoir 207 for the fluid delivered by the pump. The control passages of one of the group of valves are shown, by way of example, connected by pipes 208 and 209 to a fluid pressure motor or "strut" 210 (of the type shown at 178 in Fig. 10), the piston stem of which is attached to a wing-flap 211. From the electromagnets of the valves an electrical cable, contained in a protective pipe 212, extends to a three-gang switch 213 mounted in the control station in the fuselage of the airplane, which fuselage is defined by the bulkhead rings 214. The switches are of the three-position type shown in Fig. 10, and their operating knobs are preferably so arranged that the positions thereof indicate the corresponding direction of movement of the wing-flap or other actuated part. Also extending to the control station are operating rods 215 which are extensions of the cam shafts 145. The handles of these rods may be located in some place which is accessible to the pilots of flight engineer in case of emergency, such as failure of the electrical system, but where they are not in the way of the other control devices. By the arrangement shown in Fig. 11, it is apparent that the requisite amount of hydraulic tubing is greatly reduced with respect to that in a conventional airplane hydraulic control system, and that the point of concentration of the valves and tubing is such that these parts are protected from damage to a considerable degree. The general arrangement is also advantageous in a single-engine airplane in which the control station (or dual control stations) is usually at some distance from the engine.

While I have herein shown and described specific embodiments of my invention, I wish it to be understood that modifications may be made without departing from the spirit of the invention, and that I intend therefore to be limited only by the scope of the appended claim.

I claim as my invention:

In an airplane having an engine for propulsion thereof mounted on a wing portion of the airplane, in combination: a movable part, a hydraulic motor for actuating said part and located adjacent thereto, a hydraulic pump driven by said engine and mounted thereon, hydraulic lines interconnecting said motor and said pump and running substantially directly therebetween, a valve controlling flow of liquid through said lines and located in said wing portion, electrical means for operating said valve, mechanical means mounted on said valve for operating the same independently of said electrical means and including means for rendering the electrical means ineffective, a manual control station located in the fuselage of the airplane, an electrical circuit for energizing said electrical means and extending to said control station, manually operable switching means at the control station for controlling said circuit, and a mechanical connection between said control station and said mechanical valve-operating means for independently operating said valve.

WILLIAM A. RAY.

REFERENCES CITED

The following references are of record in the file of this patent:

UNITED STATES PATENTS

| Number | Name | Date |
| --- | --- | --- |
| 359,303 | Westinghouse | Mar. 15, 1887 |
| 570,045 | Ongley | Oct. 27, 1896 |
| 2,119,181 | Saulnier | May 31, 1938 |
| 2,132,953 | Indge | Oct. 11, 1938 |
| 2,199,914 | Haberstump | May 7, 1940 |
| 2,209,608 | Nye | July 30, 1940 |
| 2,222,144 | Ferris | Nov. 19, 1940 |
| 2,226,821 | Kempson | Dec. 31, 1940 |
| 2,259,439 | DeGanahl | Oct. 21, 1941 |
| 2,301,028 | Esch | Nov. 3, 1942 |
| 2,310,124 | Shartle | Feb. 2, 1943 |
| 2,315,501 | Crane et al. | Apr. 6, 1943 |
| 2,316,235 | Gast | Apr. 13, 1943 |